N. P. DAZEY.
CHURN.
APPLICATION FILED JUNE 5, 1916.
1,250,810. Patented Dec. 18, 1917.
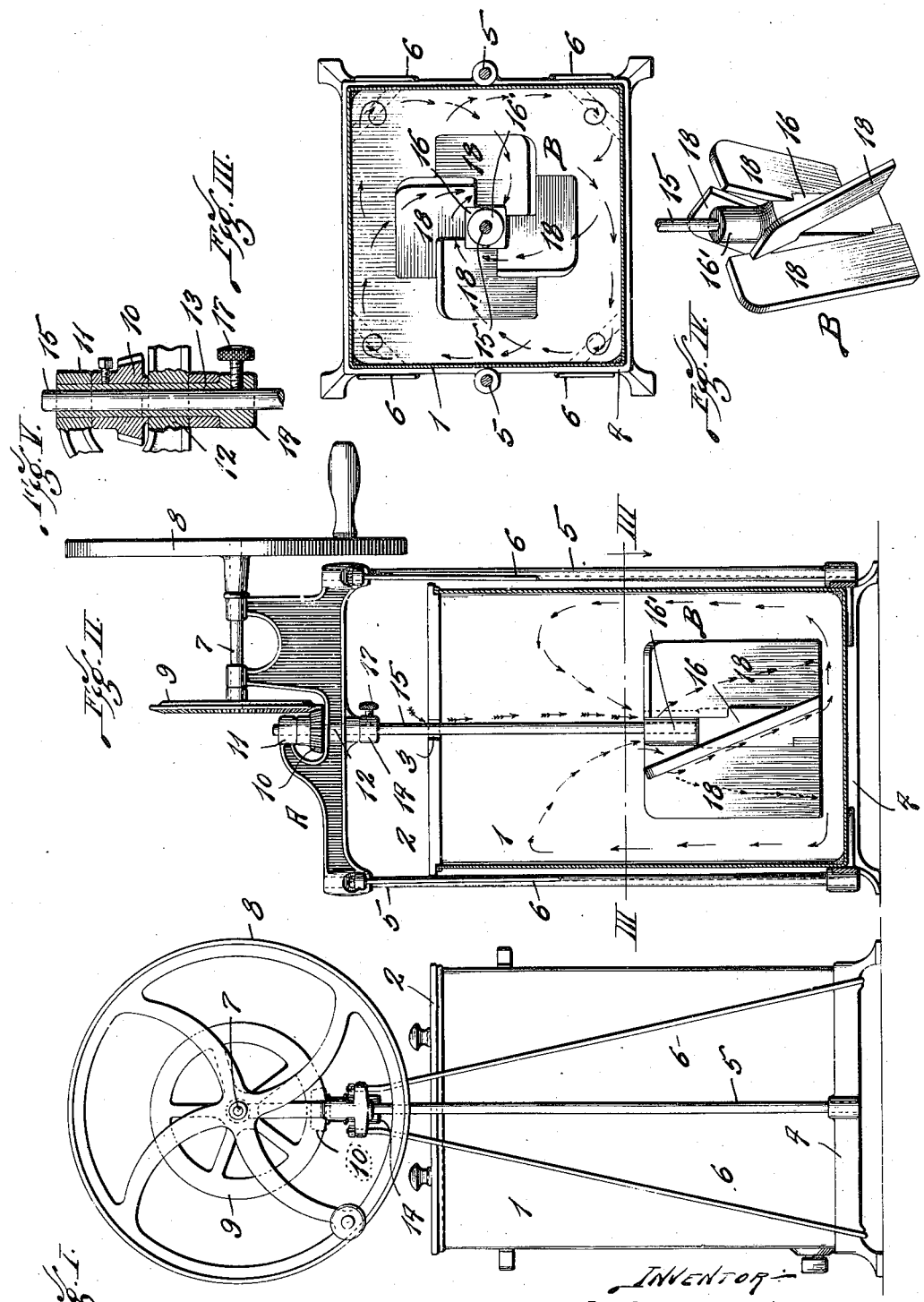
INVENTOR
N. P. Dazey,
Knight + Cook attys.

UNITED STATES PATENT OFFICE.

NATHAN P. DAZEY, OF ST. LOUIS, MISSOURI.

CHURN.

1,250,810.  Specification of Letters Patent.  Patented Dec. 18, 1917.

Application filed June 5, 1916. Serial No. 101,760.

*To all whom it may concern:*

Be it known that I, NATHAN P. DAZEY, a citizen of the United States of America, a resident of the city of St. Louis, State of Missouri, have invented certain new and useful Improvements in Churns, of which the following is a full, clear, and exact description, reference being had to the accompanying drawings, forming a part of this specification.

My invention relates to improvements in churns, and comprises certain combinations of elements whereby cream is circulated and otherwise acted upon to remove the tiny globules of butter fat therefrom, without injuring their soft skins or tissues. To obtain the best results, the force and motion of the cream in the churn must be in accordance with a scientific method based upon the nature of cream and its butter making properties, and as a result of a careful study of the subject it has been found that if the cream is acted upon in the proper manner, the tiny globules of butter fat may be removed without breaking their soft skins or tissues. The ordinary churns including the dash and numerous others, smash these tissues, breaking the globules and allowing the butter fat to form in a salvy mass, the oily butter fat being mixed with milk or whey. Obviously, the scientifically correct method of making pure butter is to remove the globules of butter fat in their natural condition, without breaking their tissues, and insofar as I am aware this has not been successfully or satisfactorily accomplished by the prior churns.

Therefore, the object of my invention is to accomplish these important results, at the same time obtaining a very high percentage of butter at the expense of very little time and energy on the part of the operator. Owing to the particular manner in which the new churn is constructed, it will also churn the cream at a very low temperature without whipping the cream, and since the globules of butter fat are unbroken it is not necessary to work the butter after the churning operation.

Figure I is a side elevation of my churn.

Fig. II is a vertical section.

Fig. III is a horizontal section taken approximately on line III—III, Fig. II.

Fig. IV is a perspective view of the dasher.

Fig. V is a fragmentary vertical section showing the rotary drive wheel and the means for securing the dasher to said drive wheel.

1 designates a non-circular receptacle provided with a closure 2 having an opening 3 for the admission of air, as indicated by arrows in Fig. II. A base 4 supports the receptacle, and rods 5 and 6 extending upwardly from the base constitute supports and braces for a bearing frame A which lies above the receptacle. A horizontal drive shaft 7, mounted in the bearing frame A, is provided with an operating wheel 8 and a beveled gear wheel 9. 10 designates a pinion arranged between bearings 11 and 12 and meshing with the wheel 9. A vertical sleeve 13 (Fig. V) rotatably mounted in the bearings 11 and 12 is secured to the pinion 10. A head or collar 14 at the lower end of the sleeve 13, engages the bottom face of the bearing 12. The sleeve and pinion are free to rotate, but the bearings 11 and 12 prevent them from moving vertically. A vertical spindle 15 is secured at its lower end to the central hub 16 of a rotary dasher B, the upper end portion of said spindle being mounted in the sleeve 13 and adjustably secured thereto by a set screw 17. Heretofore, in churns of this general type, the rotary dasher has been mounted in a fixed position near the base of the receptacle and in churning a large quantity of cream it has been difficult to rotate the dasher, more energy being required to turn the dasher when it lies below and is subjected to the weight and pressure of a large body of liquid. The dasher herein shown may be adjusted vertically to a point near the top of the cream so that it will turn freely, regardless of the quantity of cream in the receptacle.

The most important features of the invention lie in the precise construction and arrangement of the elements of the dasher, said dasher being somewhat similar to prior devices, but the action or results obtained by the new dasher are essentially different from the results derived from the prior devices.

To appreciate the value of the new results, it will be necessary to consider the nature of the constituents of cream, its butter making properties, and the precise manner in which the cream is circulated and otherwise acted upon by the dasher.

The rotary dasher is of the turbine type having straight flat blades 18, inclined downwardly at a particular angle to the vertical axis of the dasher, so as to roll the tiny globules of butter fat down the incline without whipping or cutting their tissues, at the same time squeezing the milk or whey from the globules and causing them to accumulate and adhere to each other, instead of mashing the globules and causing the butter to be oily or salvy. It is to be understood that there are millions of these globules in each drop of cream, and as they roll downwardly under the inclined blades (which must lie at the proper angle) the globules strike against and stick to each other and they are gently but firmly rolled together. At first only two adhere to each other, then they gradually accumulate more rapidly, the action being similar to that of a snowball rolling down a hill. Finally the tiny globules form a mass of butter fat about the size of a grain of rice, when churning should be stopped. At this time all of the butter making properties have been assembled and rolled into firm, solid grains of uniform size, the milk or whey being squeezed from the globules immediately before they adhere to each other, and while they are rolling down the inclines. To obtain these important results, the inclined blades of the dasher must be arranged at such an angle that the rotary dasher will impart the required motion and pressure to the globules as they roll down the inclines. I, therefore, arrange the blades at an angle of approximately 22 degrees from a vertical line, and in actual practice it has been clearly demonstrated that plain, flat, wooden blades arranged at this angle will accomplish all of these desired results.

It is also important to subject the entire mass of cream to a continuous and uniform churning action, and I therefore provide a substantially central inlet at the upper end of the dasher, the upper ends of the inclined blades being separated from each other and also from the rounded extension 16' at the upper end of the dasher hub. It will be noted that the blades are extended upwardly to points opposite the rounded extension 16', and that the cream can circulate around the rounded extension 16' and outwardly between the separated inner edges of the blade extensions and the hub extension without any cutting action. When the dasher is rotating the cream circulates approximately as indicated by arrows in Figs. II and III. It is forced downwardly and outwardly by the inclined blades and whirled in the receptacle. The whirling current of cream moving toward the top of the receptacle strikes the receptacle walls and is deflected approximately as indicated in Fig. III. A funnel shaped whirlpool is formed at the surface of the cream and the downwardly moving cream in the whirlpool circulates toward the axis of the dasher. Hence, the downwardly moving body of cream in the whirlpool, produced as mentioned, enters the central inlet at the upper end of the dasher, flowing outwardly between the separated blades, and downwardly along the inclined faces of said blades. The funnel shaped whirlpool leading downwardly to the central inlet of the dasher causes air to be drawn downwardly from the opening 3 in the receptacle closure, as indicated by arrows in Fig. II, and this air is thoroughly mixed with the whirling cream with a resultant aeration of the latter, which greatly facilitates the production of butter from the cream. The downwardly moving body of cream, after being thoroughly and uniformly aerated in the whirlpool, passes to the blades and is thrown therefrom by centrifugal force to return into the whirlpool again and again in rapid succession, so that butter is obtained very quickly in the operation of the churn.

I claim:—

1. In a churn, a receptacle having an air inlet at its upper end, and a rotary dasher in said receptacle, said rotary dasher comprising a central hub having a round extension at its upper end, and a series of blades extending outwardly from the lower portion and diagonally of the axis of the hub, the upper portions of all of said inclined blades being opposite the round extension of said hub and spaced therefrom, to provide a central inlet at the top of the dasher between said round extension and the blades, permitting the formation of a whirlpool leading downwardly to said round extension of the dasher hub in which the cream is aerated, the blades of the dasher serving to throw the aerated cream outwardly from the central inlet at the upper end of said dasher toward the wall of said receptacle.

2. A churn dasher comprising a central hub having a round extension at its upper end, and a series of blades extending outwardly from the lower portion of the hub and diagonally of the axis of the hub, the upper portions of all of said blades being opposite the round extension of said hub and spaced therefrom to provide a central inlet at the top of the dasher between said extension and said blades.

NATHAN P. DAZEY.